May 13, 1941.    E. M. CLAYTOR    2,241,632
OVERDRIVE CONTROL SYSTEM
Filed Nov. 10, 1939

INVENTOR
Edward M. Claytor
BY
Spencer Hardman & Fehr
his ATTORNEYS

Patented May 13, 1941

2,241,632

UNITED STATES PATENT OFFICE 2,241,632

OVERDRIVE CONTROL SYSTEM

Edward M. Claytor, Anderson, Ind., assignor to General Motors Corporation, Detroit, Mich., a corporation of Delaware Application November 10, 1939, Serial No. 303,784

7 Claims. (Cl. 74—472)

This invention relates to electrically operated means for controlling the overdrive gearing for an automotive vehicle. One type of overdrive with which the present invention may be used is one in which a shaft transmitting power from the change speed gearing of the automobile may be connected with the propeller shaft for a 1-to-1 gear ratio drive or indirectly through planetary gearing of the overdrive by means of which the propeller shaft is caused to rotate faster than the drive shaft. The planetary gearing includes a sun gear which rotates with the drive shaft when the overdrive is not operative. To render the overdrive operative, the sun gear must be held stationary. In my copending application S. N. 241,917, filed November 23, 1938, I disclose an overdrive control in which the sun gear locking pawl is urged normally into locking position by a spring and in which the locking pawl is retracted by the operation of a solenoid. In order to facilitate retraction of the sun gear locking pawl by the solenoid I provide a relay which disables the ignition circuit momentarily until the solenoid has completed its operation. The disabling of the ignition circuit causes the engine to cease firing until the sun gear latch or pawl is withdrawn, whereupon the normal firing is reestablished.

The present invention relates more particularly with an overdrive controlled by a sun gear locking pawl which is actuated by the solenoid into locking position and by a spring out of locking position. The present invention is concerned with momentarily disabling the ignition circuit during the time in which the sun gear locking pawl is retracted by spring operation. According to the disclosure of my copending application Serial No. 290,356, filed August 16, 1939, I control the time during which the ignition circuit is interrupted, by means of electro-magnetic relay which operates to maintain the ignition circuit open for a measured time after the solenoid circuit is interrupted. This measured time is controlled by the relay and is independent of the movement of retracting of the sun gear locking pawl. The time delay is greater than the time required under all normal conditionse for the sun gear locking pawl to be withdrawn. In case the pawl is not retracted for any reason, such as failure of the return spring, the sticking of the pawl due to heavy, cold lubricant or due to excessive negative pressure as when going down a long grade, the relay completes the ignition circuit in any event.

In my copending application Serial No. 290,356, I disclose a solenoid control relay having a magnet coil which is connected with the current source by three switches in series, namely, a normally open switch which is closed in response to the establishment of certain trains of gears between the engine and the propeller shaft of the vehicle, a normally open switch closed when the vehicle speed attains a certain value, and a normally closed switch which is manually opened. The solenoid control relay closes the contacts which connect the current source with the solenoid attracting and holding coils and with the magnet coil of the measured time relay. When the normally closed control switch is manually opened, flux starts to decay in the solenoid control relay. After a certain amount of flux decay in this relay has taken place, it opens; then the decay of flux in the solencid and in the measured time relay begins. Finally a spring of the solenoid overcomes the decaying flux of the solenoid and urges the sun-gear-locking pawl into non-locking position. The rate of flux decay of the measured time relay being relatively slow, this relay remains in condition for withholding operation of the ignition to produce a condition favorable to the retraction of the pawl by the solenoid return spring. Obviously part of the predetermined or measured time of delay of the time relay is occupied with the time required for decay of flux in the solendid so that the pawl return spring can be effective to return the pawl to non-locking position. Therefore the time required for withholding the operation of engine ignition should equal at least the time required for solenoid flux to decay plus the time required for pawl retraction after solenoid flux has decayed to the value making it possible for the pawl return spring to retract the pawl.

It is an object of the present invention to minimize the time required for withholding the operation of the engine ignition. To accomplish this object I provide a system wherein a relatively small portion, if any of the period of the withholding of the operation of the ignition which is provided by the measured time relay, is occupied by the time required for the decay of solenoid flux sufficient for the pawl return spring to be effective to return the pawl to non-locking position. More specifically, I combine with a solenoid having an armature attracting coil and an armature holding coil, a solenoid relay having a single pair of contacts for connecting the current source with the solenoid armature attracting coil and with the magnet coil of the measured time relay, and a separate control circuit for directly connecting the current source with the solenoid holding coil and the magnet coil of the solenoid relay, said coils being in parallel. This control circuit is closed jointly in response to the establishment of certain trains of gears in the transmission of the vehicle and in response to vehicle speed, and is manually opened. In this way I provide a system of control in which the solenoid flux starts to decay before the solenoid control relay opens to cause the flux of the measured time relay to begin to decay. Practically, the pawl return spring is effective to start the movement of the pawl into non-locking position by the time the solenoid control relay has opened to initiate the action of the measured time relay to delay the reestablishment of operation of the engine ignition. Therefore the measured time of delay will be less in the present system than in the system of my application 290,356. Consequently the electrical and physical dimensions of the time lag elements of the measured time relay will be less, thereby resulting in more economical manufacture of this relay. The solenoid control relay might even be constructed to provide some of the time lag required for withholding operation of engine ignition, thus relieving the measured time relay of some of this duty.

Further objects and advantages of the present invention will be apparent from the following description, reference being had to the accompanying drawing wherein a preferred embodiment of the present invention is clearly shown.

Figures 1, 2:
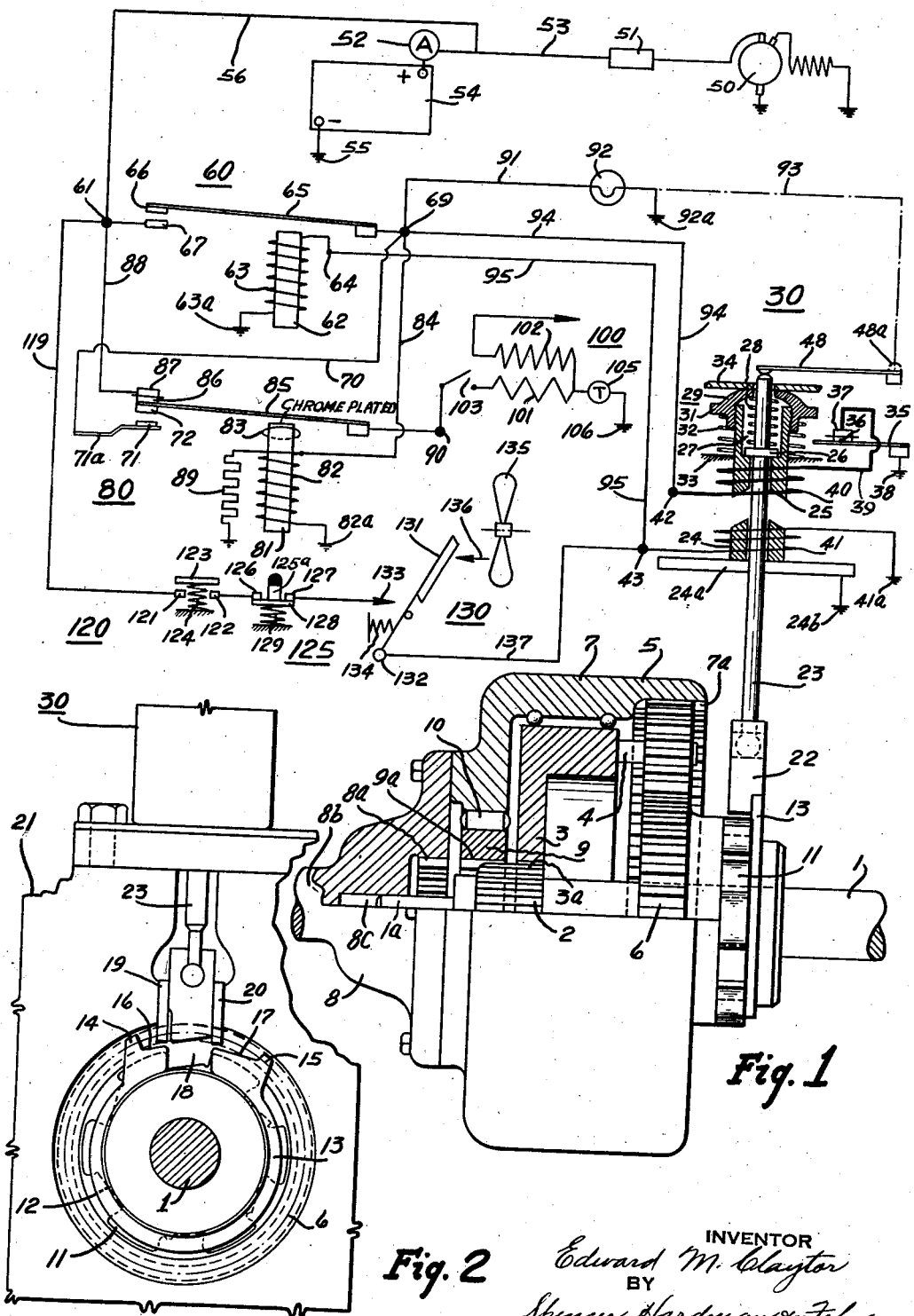
Fig. 1 shows a diagram of an overdrive to which the control of my present invention is applied, said control being illustrated by a wiring diagram forming a part of Fig. 1.
Fig. 2 is a diagram showing the sun gear locking pawl and pawl blocking member which has been moved to position to permit movement of the latch into engagement with the sun gear locking ring.

Referring to Fig. 1, numeral 1 indicates the driving shaft of the overdrive mechanism. The shaft 1 receives its power from the change speed gear mechanism housed in a box which would be located between the overdrive mechanism and the engine clutch. The shaft 1 is provided with external splines 2 which mesh with internal splines 3a of the ring 3 and with internal splines 9a of the driving member of an overrunning clutch 9. The external splines 2 mesh also with internal splines 8a of a coupling member 8 to which the propeller shaft 8b may be attached. The splines 2 connect together the members 3 and 9 as shown in Fig. 1, when it is desired to use the overdrive mechanism. When it is not intended that the overdrive mechanism shall be used for any considerable period of time, the overdrive may be entirely disconnected by moving the shaft 1 endwise toward the left so that its external splines 2 will engage the internal splines 8a of the member 8, thus connecting together the members 8 and 9 and leaving the member 3 free. The shaft 1 is supported for axial movement at both ends. The support for the right hand end of the shaft 1 is not shown. At the left end of the shaft 1 it is provided with a reduced portion 1a having a sliding fit within an axially aligned recess 8c provided in the member 8.

The ring 3 carries a plurality of rods 4 each rotatively supporting a planet gear 5 which meshes with a sun gear 6 and with an internal ring gear 7a integral with ring 7, which cooperates with the clutch rollers 10, which in turn cooperate with a driving clutch cam 9 to receive transmission of torque from the driving member 1 at such time as the driving member 9 tends to rotate ahead of the member 7. However, when a ring 11 attached to the sun gear 6 is engaged by a sun gear locking pawl 22 which is received by one of a series of notches 12 in ring 11, the internal ring gear 7a and its ring 7 are driven at a speed exceeding the speed of the clutch driving member 9. Under these conditions the ring 7 will overrun the clutch driving member 9. The pawl 22 is normally maintained out of engagement with the ring 11 by a pawl rod 23 which is controlled in a manner to be described. Movement of the pawl 22 into engagement with the ring 11 is obstructed, except under certain conditions, by a blocker plate 13 which is frictionally dragged by ring 11. The blocker plate 13 is provided with stop lugs 14 and 15 which project beyond stop surfaces 16 and 17 which may be engaged under certain conditions by the pawl 22. The surfaces 16 and 17 are interrupted by a notch 18 of sufficient width to permit movement of the pawl 22 between the surfaces 16 and 17 when the notch 18 is brought into alignment with the pawl 22, as shown in Fig. 2. The pawl 22 is guided between bosses 19 and 20 of the frame 21 of the overdrive mechanism. Bosses 19 and 20 project into the plane of the blocker plate 13 so as to be engaged by lugs 14 and 15, respectively. When the ring 11 rotates clockwise, the blocker plate 13 will be frictionally dragged clockwise until its lug 14 strikes the boss 19, and further movement of the blocker plate 13 in the clockwise direction will cease. When the ring 11 rotates counterclockwise, the blocker plate 13 will be frictionally dragged counterclockwise until its lug 15 engages the boss 20 whereupon counterclockwise movement of the plate 13 will cease. An explanation of the clockwise and counterclockwise movements of the ring 11 will be given in connection with the mode of operation of the control device which controls the overdrive gearing.

The sun gear locking pawl 22 is attached to a pawl rod 23 forming part of a solenoid unit 30. Rod 23 extends through a solenoid stationary core 24 and through a solenoid armature 25. Rod 23 has a shoulder portion 26 located within a recess 27 provided by the armature 25. Recess 27 houses a coil spring 28 located in a state of compression between the shoulder 26 and a nut 29 threadedly attached to the armature 25. Nut 29 has a flange 31 engaged by coil spring 32 located in a state of compression between flange 31 and a stationary member 33. Spring 32 normally urges the nut 29 against a stationary plate 34. Flange 31 is engageable with a resilient contact arm 35 carrying a contact 36 normally engaged with a contact 37. Arm 35 is grounded at 38. Contact 37 is connected with the main attracting coil 40 of the solenoid connected with a terminal 42. Coil 40 is a series coil comprising a relatively small number of turns of relatively coarse wire. Terminal 43 is connected with solenoid holding coil 41 which comprises a relatively large number of turns of fine wire. Holding coil 41 is grounded at 41a. The rod 23 extends through the nut 31 and the stationary stop plate 34 to engage a leaf spring contact 48 connected with a terminal 48a.

The solenoid unit is described in further detail in my copending application S. N. 290,356, filed August 16, 1939.

A generator 50 is connected through a reverse circuit relay 51, an ammeter 52 and a wire 53 with a storage battery 54 grounded at 55. A wire 56 connects wire 53 with terminal 61 of a relay 60. Relay 60 comprises a core 62 surrounded by a magnet winding 63 grounded at 63a and connected with a terminal 64. Core 62 cooperates with an armature 65 normally resiliently urged away from the core and connected with terminal 69. Armature 65 carries a contact 66 for engaging a contact 67 connected with terminal 61.

Numeral 80 designates a measured time relay having a core 81 surrounded by a magnet coil 82 grounded at 82a and connected by wire 84 with terminal 69 of relay 60. Core 81 has a chromium plated head end against which armature 85 will seal when attracted. Armature 85 is normally biased away from the core 81 and carries a contact 86 normally engaging a contact 87 connected by a wire 88 with terminal 61 of relay 60. Armature 85 carries a contact 72 normally separated from a contact 71 connected by a wire 70 with terminal 69 of relay 60. A non-inductive resistance 89 is connected in shunt with magnet coil 82 and a short circuited coil 83 surrounds core 81 for a purpose to be described later. At least one of the pair of contacts 71—72 should be resiliently mounted as at 71a.

Numeral 100 designates an ignition coil having a primary 101 and a secondary 102. Primary 101 is connected with terminal 90 of relay 80 through an ignition switch 103. Primary 101 is connected with an ignition timer 105 grounded at 106. When the overdrive is not operating the circuit between the battery 54 and coil 100 includes contacts 86—87 of relay 80.

Wire 91 connects terminal 69 of relay 60 with an indicator lamp 92 grounded at 92a. An alternative circuit is to omit ground 92a and to substitute wire 93, terminal 48a, contact 48, pawl rod 23, solenoid base 24a and ground 24b.

Wire 95 connects solenoid terminal 43 with terminal 64 of relay 60.

Terminal 61 of relay 60 is connected by wire 119 with a gear switch 120 having stationary contacts 121 and 122 adapted to be bridged by movable contact 123 held out of engagement with stationary contacts by a spring 124. The gear switch 120 is closed by mechanism for controlling the connection of certain trains of gears between the engine shaft and the propeller shaft of the automobile. For example, switch 120 may be closed by mechanism which is actuated when the manually operated gear shaft lever is in intermediate position or in high speed position. Switch 120 might be closed by the mechanism for shifting the shaft 1 into the position shown in Fig. 1. When the shaft 1 is moved toward the left to disconnect gear 1 from element 3 and to connect gear 2 with element 8a the switch 120 would be opened.

Switch 120 is connected with kick switch 125 comprising stationary contacts 126 and 127 normally engaged by contact 128 held normally in contact closing position by a spring 129. The switch 125 is opened by a suitable pedal cooperating with switch actuating rod 125a. This pedal may be the engine throttle or accelerator pedal which causes the switch 125 to open by movement of accelerator pedal beyond wide open throttle position.

Switch 125 is connected with a switch responsive to vehicle speed such as an air switch 130 having a vane 131 pivoted at 132 maintained normally out of engagement with contact 133 by a spring 134. The vane 131 is moved into engagement with contact 133 by the action of an air current provided by the engine cooling fan 135 which causes a current of air to impinge upon the vane 131 as indicated by the arrow 136. Vane 131 is connected by wire 137 with solenoid terminal 43.

The operation of the overdrive system illustrated by Fig. 1 is as follows: While the engine is running the ignition switch 103 will be closed. When the vehicle transmission is set for drive through certain gear trains, the switch 120 will be closed. When the vehicle speed attains a certain value such as 25 M. P. H. for example, the air switch 130 will be closed. As stated before, switch 125 is normally closed. All three switches 120, 125 and 130 being closed, the winding 63 of relay 60 will receive current from the battery 54 thereby causing armature 65 to be attracted and contact 66 to engage contact 67. Solenoid holding coil 41 will also be connected with the battery 54 when switches 120, 125 and 130 are closed. The holding coil 41 is therefore energized but does not, by itself, effect the attraction of solenoid armature 25.

When contact 66 engages contact 67 the solenoid attracting coil 40 is connected with the battery through the following circuit; battery 54, wire 56, terminal 61, contacts 66—67, armature 65, terminal 69, wire 94, terminal 42, winding 40, wire 39, contact 37, contact 36, arm 35, ground 38, and battery ground 55. Both windings 40 and 41 cooperate to attract solenoid armature 25 toward core 24. As armature 25 moves downwardly, it carries with it the nut 29 which urges the upper end of the spring 28 downwardly thereby tending to move the rod 23 downwardly.

When the solenoid is not excited, the spring 32, acting through the pawl rod 23, keeps pawl 22 out of engagement with the blocker plate 13. When the engine drives the transmission, the ring 11 moves counterclockwise as viewed in Fig. 2 and the plate 13 is frictionally dragged counterclockwise so that its lug 15 engages boss 20 thereby causing surface 17 to be in the path of movement of the pawl 22. When the engine speed is increased to the speed where the governor switch 130 closes, the hand controlled change speed gearing being in intermediate or high gear, the solenoid will be energized in the manner described. The pawl 22 is then urged downwardly by spring 28 and presses against surface 17. Engagement of the pawl 22 with the notched locking ring 11 is prevented until the speed of ring 11 is reduced to zero and the rotation of ring 11 reverses.

The reversal of ring 11 is effected by a reduction of engine speed (measured in miles per hour of vehicle speed) below vehicle speed by a predetermined amount dependent upon the gear ratio of overdrive to normal drive. For example, if the overdrive increases the speed ratio between vehicle drive wheels and the engine by 30%, the engine speed must be reduced below vehicle speed by the amount of 30% of vehicle speed. Assuming the vehicle is being propelled through normal drive at 40 M. P. H. and it is desired to go into overdrive, the driver releases the accelerator pedal to permit engine speed to decrease. The vehicle "free wheels" (through overrunning clutch 9—10) at a speed starting at 40 M. P. H. and diminishing slightly due to resistance of wind and friction to about 35 M. P. H. Meanwhile the engine speed has diminished to 24 M. P. H., which speed is slightly more than 30% less than 35 M. P. H., the concurrent vehicle speed. As the engine speed decreases to 24 M. P. H., the speed of ring 11 is reduced to zero and then the ring 11 starts to reverse in direction of rotation or to move clockwise as viewed in Fig. 2. As ring 11 begins to move slowly clockwise, it drags frictionally the blocker plate 13 clockwise thereby causing its lug 15 to move away from the boss 20 and its notch 18 to become aligned with pawl 22 thereby permitting spring 28 to press pawl 22 against a tooth of ring 11. As ring 11 continues to rotate, it brings a notch 12 into alignment with pawl 22 thereby permitting spring 28 to press pawl 22 into locking engagement with the ring 11 thereby locking sun gear 6. While the sun gear 6 is locked, transmission of power from the shaft 1 to the shaft 8b takes place through the elements 2, 3a, 3, 4, 5, 7a, 7 and 8. The sun gear 6 being stationary, the ring gear 7a rotates faster than shaft 1. Since parts 9 and 7 are connected through a one-way clutch represented by the numeral 10, the ring 7 overruns the shaft 1 while the overdrive is effective.

During movement of the solenoid armature 25 toward the core 24 in order to preload the spring 28 so that it may push the pawl 22 into a notch 12 of the sun gear locking ring 11 when the blocker 13 is retracted, the flange 31 of nut engages the resilient contact arm 35 thereby separating contact 36 from contact 37 and breaking the circuit through the main attracting coil 40 of the solenoid. The armature 25, being then in relatively close proximity with the core 24, is held in the attracted position by the holding coil 41.

When contacts 66—67 of relay 60 are closed, winding 82 of relay 80 is connected with the battery through the following: battery 54, wire 56, terminal 61, contacts 67—66, armature 65, terminal 69, wire 84, coil 82, ground 82a and battery ground 55. Armature 85 is attracted toward core 81 to cause the contact 86 to separate from contact 87, and contact 72 to engage contact 71. Armature 85 seats on core 81 for a purpose to be described. While the overdrive is operating the ignition coil 100 is connected with the battery 54 through contacts 71—72 of relay 80 and contacts 66—67 relay 60.

When the driver desires to render the overdrive inoperative, he presses the kick-switch rod 125a to interrupt the flow of current through the winding 63 of the relay 60 and solenoid holding coil 41. The solenoid armature 25 and the relay armature 65 are relieved of magnetic pull and the armature 65 returns to normal position separating contact 66 from contact 67, and momentarily interrupting the flow of current to the ignition coil 100 to produce a condition which will permit the pawl 22 to be retracted from the sungear locking ring 11. Then the spring 32, by operating through the nut 27, and the nut 27, by operating on the shoulder 26, causes the pawl rod 23 and the pawl 22 to be restored to retracted position. During upward movement of rod 27, the resilient contact arm 35 is relieved from engagement with the flange 31 of nut 29 thereby permitting the contact 36 to reengage the contact 37.

For a predetermined time after the separation of the contacts 66—67 of relay 60, the contacts 86—87 of relay 80 remain open, although current ceases to flow through winding 82 of relay 80 due to the opening of contacts 66—67 of relay 60. This predetermined time is measured or determined by the relay 80. The lag or time delay between the opening of contacts 66—67 of relay 60 and the closing of contacts 86—87 of relay 80 is effected by causing the armature 85 to seat or seal against the core 81 of relay 80 when its contacts are opened, thereby making it necessary for the magnetic flux in the core 81 to diminish substantially to zero before the armature 85 is released. The decay of flux in the core 81 is retarded by the non-inductive resistance 89, and by the short-circuit coil 83. Either or both of the elements 83 and 89 may be used for this purpose. During this measured time interval between the opening of contacts 66—67 of relay 60 and the closing of contacts 86—87 of relay 80, the ignition circuit is interrupted due to the fact that the ignition circuit through armature 65, wire 70 and the contacts 71—72 has been opened by the separation of contacts 66—67. The disconnection of the ignition coil 100 from the battery 54 eliminates the igniting of several charges of fuel thereby causing the engine to cease to drive the vehicle and thereby relieving the torque reaction between the sun gear locking ring 11 and the pawl 22 in order to facilitate retraction of the pawl by the spring 32. The pawl 22 having been relieved of a pressure placing a frictional drag on the pawl, the pawl 22 and its rod 23 move upwardly due to the action of the spring 32.

If the signal lamp 92 is grounded at 92a and circuit 93 to the solenoid 30 is omitted, the lamp 116 will burn as long as the relay 60 is closed. When ground 92a is used, the lamp 92 burns to indicate that the overdrive control relay is operating. If the ground 92a is omitted and lamp 92 is connected to ground through wire 93 terminal 48a contact 48 and rod 23, which is grounded through the solenoid as indicated at 24b, the lamp 92 will go out during movement of the pawl 22 into sun-gear locking position. If the lamp 92 is grounded in this manner, the burning of lamp 92 indicates that the control mechanism has started to function to render the overdrive operative, and the subsequent extinguishing of the lamp indicates that the overdrive is operative.

From the foregoing description of the construction and mode of operation of a control circuit embodying my invention it is apparent that I have provided electromagnetic means operating independent of the solenoid for causing the ignition circuit to be interrupted for a predetermined interval of time sufficient to enable the return spring 32 of the solenoid to operate to retract the pawl 22 while the torque reaction is relieved between the pawl 22 and the sub gear locking ring 11. In any event, the time delay afforded by the relay 80 is greater than the time required under all normal conditions for the retraction of the pawl 22. In case the pawl 22 is not retracted for any reason such as failure of the return spring 32, the relay 80 completes the ignition circuit.

By placing solenoid holding coil 41 directly in the circuit of switch 125, I cause the decay of flux of solenoid 30 to start to decay before relay 60 opens. Therefore, by the time the decay of flux of relay 80 begins, there has been substantial reduction in flux of the solenoid 30. Therefore the time required of the relay 80 to hold the ignition circuit open has been minimized because this time does not include all of the time required for decay of solenoid flux as well as decay of flux of relay 80. Therefore the time delay of relay 80 can be shortened, and the electrical and physical dimensions of elements 83 or 89 could be made less. This is conducive to economical manufacture. In fact relay 60 could be made to share with relay 80 the duty of withholding ignition operation. In such case, relays 60 and 80 might have similar cores and similar short-circuited coils 83; or similar resistances 89 could be connected in parallel with the winding of these relays.

It is apparent that I have provided the combination with a sun gear locking pawl normally held out of locking position by a spring of a solenoid for actuating the pawl into locking position, said solenoid being controlled automatically in response to vehicle speed and in response to the status of the vehicle transmission gears, means under the control of the operator for rendering the solenoid inoperative and also for open-circuiting the ignition system so that conditions are produced which are favorable to the retraction of the pawl by the spring, and means for restoring the ignition to operative condition independent of any control by the driver and independent of any movement of the pawl to non-locking position. This last named means function automatically to restore the ignition to operative condition a measured time interval after operation of the means which renders the solenoid inoperative. Since there is a time interval of appreciable duration between the rendering of the ignition inoperative and the restoration of the ignition to operative condition, I have brought about two separate instances where conditions are favorable to the retraction of the pawl from sun gear locking position by the pawl returning spring.

Let us first consider the instance where the ignition is rendered inoperative. It will be understood there is a certain amount of lost motion or side-play between the pawl 22 and the sides of a notch 12 of the locking ring 11. While the engine ignition is operative and the engine drives the vehicle, the torque transmitted by the engine to the vehicle drive wheels is what I term as positive torque. When the engine ignition is rendered inoperative, the vehicle tends to drive the engine and the transmission of torque is reversed. I designate this reversed torque as negative torque. When positive torque is present the pawl 22 will press against one side of a notch 12 and, when negative torque is present, the pawl 22 will press against the other side of the notch 12. It is obvious that, if the ignition is rendered inoperative causing the engine to cease to fire, the torque will change from positive to negative and the pawl 22 will move from a position where it presses against one side of the notch 12 to a position where it presses against the other side of the notch. During the period of time of relative side-wise movement between the notch 12 and the pawl 22 in which the pawl 22 relatively moves from one side of the notch 12 to the other, there is a condition where there is no binding force between the ring 11 and pawl 22 to resist withdrawal of the pawl 22 by the pawl return spring 32. This change from positive torque to negative torque produces a condition which is favorable to the retraction of the pawl 22 from the ring 11. Obviously the duration of this condition is relatively short, since it continues only long enough for the pawl to leave one side of the notch, traverse the lost motion space between the sides of the notch and then engage the opposite sides of the notch. Under some unusual circumstances, this period of short duration might not be sufficient for the pawl 22 to be completely withdrawn from the sun gear locking ring 11. However, another instance of favorable conditions for retraction of the pawl 22 by the spring 32 is afforded.

At the end of the measured time interval provided by relay 80 during which the ignition may be inoperative, there is another condition of no binding between the pawl 22 and ring 11 at the instant when the ignition apparatus is rendered operative, because there is another reversal of torque from negative torque to positive torque. Therefore, the present invention provides two instances which are favorable to the retraction of the pawl 22 of the sun gear locking ring 11. Therefore there are two opportunities for the pawl 22 to be retracted.

In order to provide a measured time relay, relay 80 disclosed herein, which will be fairly uniform in operation, I plate the core 81 against which the armature 85 seals with a coating of non-magnetizable metal such as chromium, which in effect introduces an air gap between the core head and the armature when the latter is in its sealed position. Without plating on the core, the sealing force which holds the armature is dependent upon the residual coercive force in the magnetic circuit and the physical dimension of actual contact areas and also the other increment areas and their respective air gap separation. This sealing force is said to be due to residual magnetism. It is made up of two parts, viz, (a) that produced over the total areas of actual contact of magnetic metal and (b) that produced over the other increment areas which have definite air gaps.

Where an air gap exists, the pull formula, for condition of constant coercive force or constant excitation, is $$P = \text{constant } x \int \left( \frac{a_1}{l_1^2} + \frac{a_2}{l_2^2} + \frac{a_3}{l_3^2} \cdots \frac{a_n}{l_n^2} \right)$$

where the air gap varies and is represented by $l_1, l_2$ etc. and the respective areas for the gaps are $a_1, a_2$ etc.

Where there is actual contact of the magnetic metal of the core head and the armature, the pull formula will include the following term:

$$P_{contact} = \text{constant } x \int \left( \frac{\phi_1^2}{a_1} + \frac{\phi_2^2}{a_2} + \cdots \frac{\phi_n^2}{a_n} \right)$$

where $\phi_1, a_1$; $\phi_2, a_2$ etc. represent the flux lines and areas respectively of contact points. As the contact area $a_1$ or $a_2$ approaches zero, the terms approach an indeterminate form, hence, as has been known in practice, armatures that seal metal to metal against magnetic core heads will have erratic sealing force due to residual magnetism. It is obvious that the erratic nature of the seal pull is due to the nature of the contact surface and the length of gap separating the magnetic parts, the zero value of air gap giving the worst results.

I have found that a chromium plating of .0002 inch to .0003 inch thick will greatly reduce the intermediate part of the pull formula and give results that are consistent for practical purposes.

The chromium plating of the core reduces the transient flux pull, therefore the relay must be constructed so as to take into account this reduction. With this point considered, I am able to produce relays which can be depended upon to give a time interval which is accurate within practical limits.

The same results would initially be accomplished by platings of brass, copper or other non-magnetizable metal. Chromium is preferred because it is a very hard metal and will give longer service because it will not hammer out, as might be the case of brass or copper.

While the embodiment of the present invention as herein disclosed, constitutes a preferred form, it is to be understood that other forms might be adopted, all coming within the scope of the claims which follow.

What is claimed is as follows:

1. An overdrive control system for an automotive vehicle propelled by an internal combustion engine having electrically operated ignition apparatus, comprising the combination of a sun-gear-locking pawl, a spring for urging the pawl into non-locking position, a current source, a solenoid for moving the pawl into locking position, said solenoid having an armature attracting coil and an armature holding coil, a solenoid relay having a magnet coil and a pair of normally open contacts for connecting the current source with the solenoid attracting coil, a control circuit including switches for connecting the current source directly with the solenoid holding coil and with the solenoid relay coil, both of said coils being in parallel, and a measured time relay for maintaining the ignition inoperative for a predetermined time after deenergization of the solenoid relay, said measured time relay having a magnet coil disconnected from the current source in response to the opening of said control circuit.

2. An overdrive control system according to claim 1 in which the measured time relay has a magnet coil energized by the closing of the solenoid relay and has two pairs of contacts for selectively completing the ignition circuit either directly with the battery or through the contacts of the solenoid relay.

3. An overdrive control system for an automotive vehicle propelled by an internal combustion engine having electrically operated ignition apparatus, comprising the combination of a sun-gear-locking pawl, a spring for urging the pawl into non-locking position, a current source, a solenoid for moving the pawl into locking position, a solenoid relay for connecting the current source with the solenoid, means for controlling the solenoid relay, and a measured time relay for withholding operation of the ignition apparatus for a predetermined time after the opening of the solenoid relay, said time relay having a magnet coil and a non-inductive resistance in parallel therewith for retarding the decay of flux in the time relay, said time relay having two pairs of contacts for selectively completing the ignition circuit either directly with the battery or through contacts of the solenoid relay.

4. An over-drive control system for an automotive vehicle propelled by an internal combustion engine having electrically operated ignition apparatus, comprising the combination of a sun-gear-locking pawl, a spring for urging the pawl into non-locking position, a current source, a solenoid for moving the pawl into locking position, means for controlling a circuit between the current source and solenoid, and a measured time relay for withholding operation of the ignition apparatus for a predetermined time following deenergization of the solenoid, said time relay having a magnet coil and a non-inductive resistance in parallel therewith for retarding the decay of flux in the time relay, said time relay having two pairs of contacts for selectively completing the ignition circuit either directly with the battery or through the means for controlling the current source-to-solenoid circuit.

5. An overdrive control system for an automotive vehicle propelled by an internal combustion engine having electrically operated ignition apparatus, comprising the combination of a sun-gear-locking pawl, a spring for urging the pawl into non-locking position, a current source, a solenoid for moving the pawl into locking position, a solenoid relay for connecting the current source with the solenoid, means for controlling the solenoid relay, and a measured time relay for withholding operation of the ignition apparatus for a predetermined time after the opening of the solenoid relay, said time relay having a magnet coil and a non-inductive resistance in parallel therewith for retarding the decay of flux in the time relay, said time relay having a pair of contacts for directly controlling the connection between the ignition apparatus and the current source, and other contacts carried by one of the relays for circumventing the effect of the control by said pair of measured time relay contacts so long as the solenoid relay remains closed.

6. An overdrive control system for an automotive vehicle propelled by an internal combustion engine having electrically operated ignition apparatus, comprising the combination of a sun-gear-locking pawl, a spring for urging the pawl into non-locking position, a current source, a solenoid for moving the pawl into locking position, a control circuit for connecting the solenoid with the current source and with the ignition apparatus, and a measured time relay normally maintaining a circuit connection between the current source and ignition apparatus and having a magnet coil rendered operative by the control circuit to break the current-source-to-ignition circuit, and a non-inductive resistance paralleling the time relay coil in order to retard the decay of flux in the time relay in order to delay the remaking of the ignition circuit a certain time after the solenoid is deenergized.

7. An overdrive control system for an automotive vehicle propelled by an internal combustion engine having electrically operated ignition apparatus, comprising the combination of a sun-gear-locking pawl, a spring for urging the pawl into non-locking position, a current source, a solenoid for moving the pawl into locking position, a measured time relay normally permitting the ignition apparatus to operate and having a magnet coil which, when energized, effects operation of the relay to render the ignition inoperative, a circuit for circumventing operation of the relay to render the ignition inoperative, means for connecting the current source with the solenoid and with the magnet coil of the time relay and for rendering said circumventing circuit operative, and a non-inductive resistance in shunt with the magnet coil of the time relay.

EDWARD M. CLAYTOR.